(12) United States Patent
Sun et al.

(10) Patent No.: US 12,613,373 B2
(45) Date of Patent: Apr. 28, 2026

(54) RECONFIGURABLE PIC ARCHITECTURE FOR BOTH PHASE AND AMPLITUDE MODULATION

(71) Applicant: Finisar Shanghai Incorporation, Shanghai (CN)

(72) Inventors: Yao Sun, Shanghai (CN); Po Dong, Fremont, CA (US); Shanshan Zeng, Shanghai (CN); Linjie Zhou, Jiaxing (CN); Liangjun Lu, Jiaxing (CN)

(73) Assignee: Finisar Shanghai Incorporation, Shanghai (CN)

( * ) Notice: Subject to any disclaimer, the term of this patent is extended or adjusted under 35 U.S.C. 154(b) by 376 days.

(21) Appl. No.: 18/327,915

(22) Filed: Jun. 2, 2023

(65) Prior Publication Data
US 2024/0385368 A1 Nov. 21, 2024

(30) Foreign Application Priority Data
May 16, 2023 (CN) .......................... 202310547879.0

(51) Int. Cl.
*G02B 6/12* (2006.01)

(52) U.S. Cl.
CPC .................... *G02B 6/12004* (2013.01); *G02B 2006/12142* (2013.01); *G02B 2006/12145* (2013.01)

(58) Field of Classification Search
CPC ............ G02B 2006/12142; G02B 2006/12145
See application file for complete search history.

(56) References Cited

U.S. PATENT DOCUMENTS

| | | | | |
|---|---|---|---|---|
| 9,547,214 B2 * | 1/2017 | Kazmierski | ........ | H04B 10/5561 |
| 10,175,422 B2 | 1/2019 | Dong et al. | | |
| 2013/0209020 A1 * | 8/2013 | Doerr | ................ | G02B 6/12004 385/2 |
| 2019/0391243 A1 * | 12/2019 | Nicolaescu | ............. | G01S 17/42 |

(Continued)

FOREIGN PATENT DOCUMENTS

| | | | | |
|---|---|---|---|---|
| EP | 2148456 A1 * | 1/2010 | ....... | H04B 10/25758 |

OTHER PUBLICATIONS

Liu et al., "A polarization insensitive 2×2 optical switch fabricated by liquid crystal-polymer composite", Applied Physics Letters, 2005, vol. 86, article No. 041115, 3 pages.

(Continued)

*Primary Examiner* — Charlie Y Peng
(74) *Attorney, Agent, or Firm* — The Webb Law Firm

(57) ABSTRACT

A photonics integrated circuit (PIC) chip includes: an input unit, including at least one optical input (IN) and a number of optical outputs (ISO); a modulation unit (MU) including a number of light modulators (M) having optical inputs(S) coupled to cal outputs ISO of the input unit, and optical outputs (T); a first stage optical switch unit (1SOSU) including a number of optical inputs (I) optically coupled to optical outputs T of the MU, and optical outputs (P), a first subset of which define a first subset of optical outputs (O) of the PIC chip; and a second stage optical switch unit (2SOSU) including a number of optical inputs I and optical outputs (O) that define second subset of the optical outputs O of the PIC chip. Each optical switch of 1SOSU and 2SOSU may be configured in a coupler mode; a bar mode; and/or a cross mode.

21 Claims, 3 Drawing Sheets

(56) References Cited

U.S. PATENT DOCUMENTS

| | | | | |
|---|---|---|---|---|
| 2020/0256728 | A1* | 8/2020 | Kita | G02F 1/212 |
| 2023/0027271 | A1* | 1/2023 | Jin | G01S 17/58 |

OTHER PUBLICATIONS

Tu et al., "State of the Art and Perspectives on Silicon Photonic Switches", Micromachines, 2019, vol. 10, No. 51, 19 pages.

Yang et al., "Broadband polarization-insensitive optical switch on silicon-on-insulator platform", Optics Express, 2018, vol. 26, No. 11, pp. 14340-14345.

Zhang et al., "Integrated Silicon Photonics Transmitter in 400GBASE-DR4 QSFP-DD Transceiver", 2021, OFC2021, M3A.2, 3 pages.

* cited by examiner

RECONFIGURABLE PIC ARCHITECTURE FOR BOTH PHASE AND AMPLITUDE MODULATION

CROSS-REFERENCE TO RELATED APPLICATION

This application claims priority to Chinese Patent Application No. 202310547879.0 filed May 16, 2023, the disclosure of which is hereby incorporated by reference in its entirety.

BACKGROUND

1. Field

The present disclosure describes a photonics integrated circuit (PIC) that supports both telecom coherent transmission and datacenter multi-lane Intensity-Modulated Direct Detection (IMDD) transmission.

2. Description of Related Art

There is a desire in the art of optical communications to provide PICs that support increasingly more and/or configurable functionality, especially in connection with coherent transmission and datacenter multi-lane IMDD transmission. Examples of such prior art PICs can be found in U.S. Pat. No. 10,175,422 to Dong et al. and in X. Zhang et al., "Integrated Silicon Photonics Transmitter in 400GBASE-DR4 QSFP-DD Transceiver", M3A.2, OFC2021.

SUMMARY

Disclosed herein is a PIC architecture design that can be used for both datacenter IMDD transmission and telecom coherent transmission transmitter chip design. The PIC architecture design can be based on any material platform (SiPh, InP. TLFN, etc.) whereupon a single PIC chip based on such architecture design can be used to support various datacenter IMDD and telecom coherent transmission.

In one non-limiting embodiment or example, the PIC chip may include N reconfigurable unit cells (on a common substrate) wherein each unit cell includes an input unit, a modulation unit comprising 4 modulators for modulation, a phase shifting unit comprising two phase shifters for generating IQ modulation, a number of optical switch units (SOSUs) comprising a total of at least three 2×2 optical switch units (OSUs) to enable reconfigurability, and one polarization rotator to incorporate polarization division multiplexing in coherent transmission. The modulators may be operated in either phase modulation mode (for coherent applications) or in amplitude (or intensity) modulation mode (for datacenter applications) by applying corresponding control signals. The phase shifters can be set to provide 90 degree phase shift for coherent applications or 0 degree phase shift for datacenter applications. One or more monitoring photo diodes (MPDs) may be used for accurate modulation mode locking feedback.

The 2×2 OSUs enable the reconfigurable design. Each OSU can be programmed or configured to operate in three states or modes: namely, bar mode, cross mode and coupler (or 3 dB coupler) mode, by applying different control signals to a control input C of each OSU. Herein, the terms '3 dB coupler' and 'coupler' mode or state may be used interchangeable. The reconfigurability between coherent and datacenter applications may be done by setting the OSUs used to work in different states. For example, for coherent applications, all 3 OSUs are set to work in 'coupler' mode and the modulators may be set to operate in the phase modulation mode, whereupon a dual-polarization IQ modulated signal will be formed at the output.

In a first form of the reconfigurable architecture, the input unit of the or each reconfigurable unit cell may be a fully passive 1:4 splitter and the modulators may be set to operate in the amplitude modulation mode, whereupon input light will be equally distributed to the 4 modulators and the OSUs are set to 'bar' mode to provide 4 IMDD signals at outputs of the PIC chip.

In a second form of the reconfigurable architecture, the input unit of the or each reconfigurable unit cell may include one passive 1:2 splitter and two passive 2:2 splitters to provide flexibility of using one laser or two lasers as an input source.

In a third form of the reconfigurable architecture, the input unit of the or each reconfigurable unit cell may include an OSU based reconfigurable design, providing dynamically control of input light paths (i.e. all input light may be sent to any one lane among multiple lanes or evenly split among the multiple lanes), which would suit more datacenter applications without additional losses.

More specifically, disclosed herein, in one non-limiting embodiment or example, is a photonics integrated circuit (PIC) chip comprising: a substrate and a unit cell comprising: an input unit formed on the substrate and including at least one optical input IN1 and optical outputs ISO1-ISO4; a modulation unit (MU) formed on the substrate, the MU including modulators M1-M4 having optical inputs S1-S4 and optical outputs T1-T4, wherein the optical inputs S1-S4 are optically coupled to optical outputs ISO1-ISO4 of the input unit, wherein each modulator is operative for modulating light received at the optical input of the modulator and for outputting the modulated light on the optical output of the modulator; a first stage optical switch unit (1SOSU) formed on the substrate, the 1SOSU including: a first optical switch unit (OSU1) including optical inputs I1 and I2 and optical outputs P1/O1 and P2, wherein the optical inputs I1 and I2 are optically coupled to the optical outputs T1 and T2 of the modulators M1 and M2, and a second optical switch unit (OSU2) including optical inputs I3 and I4 and optical outputs P3 and P4/O4, wherein the optical inputs I3 and I4 are optically coupled to the optical outputs T3 and T4 of the modulators M3 and M4; and a second stage optical switch unit (2SOSU) formed on the substrate, the 2SOSU including a third optical switch unit (OSU3) including optical inputs I5 and I6 and optical outputs O2 and O3, wherein the optical inputs I5 and I6 are optically coupled to optical outputs P2 and P3 of OSU1 and OSU2.

In one non-limiting embodiment or example, the PIC chip may comprise a number of unit cells.

DESCRIPTION

Figure 1:
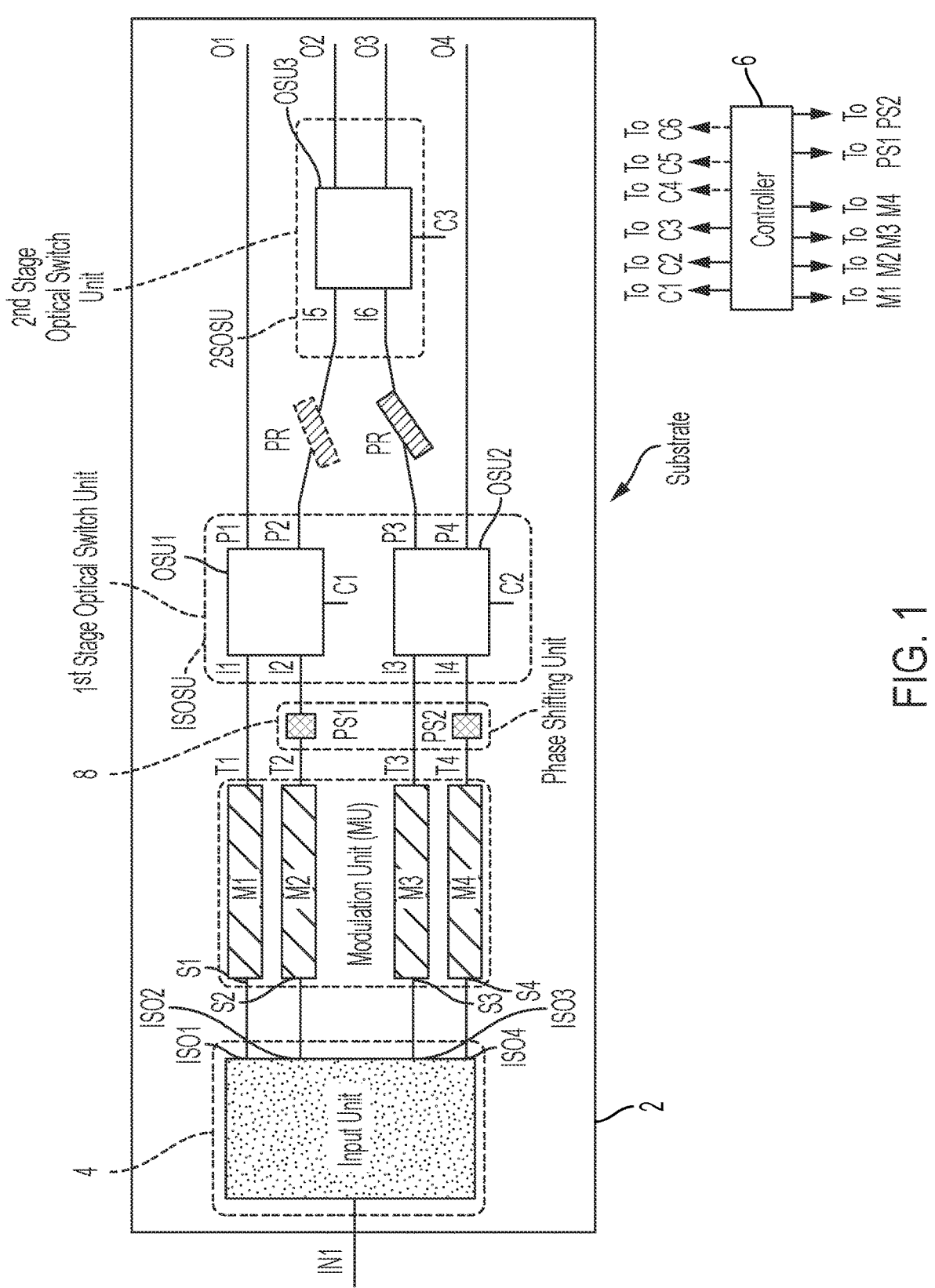
FIG. 1 is a schematic of an example PIC chip in accordance with the principles of the present disclosure comprising a reconfigurable unit cell that includes, optically coupled to each other from left to right in the figure, an input unit, a modulation unit (MU), an optional phase shifting unit, a first stage optical switch unit (1SOSU), an optional polarization rotator (PR), and a second stage optical switch unit (2SOSU), wherein the PIC chip may include an optional controller or the controller may be provided separate from the PIC chip.

Various non-limiting examples will now be described with reference to the accompanying figures where like reference numbers correspond to like or functionally equivalent elements.

For purposes of the description hereinafter, terms like "end," "upper," "lower," "right." "left." "vertical," "horizontal," "top." "bottom," "lateral." "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the disclosure. Hence, the specific examples or aspects disclosed herein are not to be construed as limiting.

With reference to FIG. 1, one non-limiting embodiment or example photonics integrated circuit (PIC) chip, in accordance with the principles of this disclosure, comprises a substrate 2 including formed thereon a unit cell comprising an input unit 4 is formed on the substrate 2. The input unit 4 may include at least one optical input IN1 and plural optical outputs ISO1-ISO4. The unit cell may also include a modulation unit (MU) formed on the substrate 2 that includes modulators M1-M4 having optical inputs S1-S4 and optical outputs T1-T4. The optical inputs S1-S4 are optically coupled to the optical outputs ISO1-ISO4 of the input unit 4. Each modulator M is operative for modulating light received at the optical input S of the modulator M, in either a phase modulation mode (for coherent applications) or in an amplitude modulation mode (for datacenter applications), by applying, from a controller 6, a corresponding control signal to the modulator M and for outputting the modulated light on the optical output T of the modulator M. Herein, terms such as "output" and "optical output"; "input" and "optical input"; and "output" and "optical output" may be used interchangeably.

The unit cell may also include a first stage optical switch unit (1SOSU) formed on the substrate 2. In one non-limiting embodiment or example, the 1SOSU may include a first optical switch unit (OSU1) including optical inputs I1 and I2 and optical outputs P1 and P2. In an example, the optical output P1 may also be considered an optical output O1 of the PIC chip and, therefore, may be referred to herein interchangeable as optical output P1/O1 or optical output P1. In an example, the optical inputs I1 and I2 are optically coupled to the optical outputs T1 and T2 of the modulators M1 and M2.

The 1SOSU may also include a second optical switch unit (OSU2) including optical inputs I3 and I4 and optical outputs P3 and P4. In an example, the optical output P4 may also be considered an optical output O4 of the PIC chip and, therefore, may be referred to herein interchangeable as optical output P4/O4 or optical output P4. In an example, the optical inputs I3 and I4 may be optically coupled to the optical outputs T3 and T4 of the modulators M3 and M4.

The unit cell may also include a second stage optical switch unit (2SOSU) formed on the substrate 2. The 2SOSU may include a third optical switch unit (OSU3) including optical inputs I5 and I6 and optical outputs O2 and O3 of the PIC chip. In an example, the optical inputs I5 and I6 may be optically coupled to optical outputs P2 and P3 of OSU1 and OSU2.

In general use of the above-described unit cell, one or more optical (e.g., laser or light) signals input into the at least one optical input IN1 of input unit 4 is output, at least in-part, by one or more of the outputs ISO1-ISO4 of input unit 4 to one or more of the optical inputs S1-S4 of the modulators M1-M4 of the MU. Each modulator M of the MU receiving an optical signal from the input unit 4 may be operative, in an example, under the control of the controller 6 for modulating the optical signal received at the optical input S of the modulator M and for outputting the modulated optical signal on the optical output T of the modulator M. The controller 6 may be separate from the substrate 2 (as illustrated in FIG. 1) or may, as may be deemed suitable and/or desirable, be incorporated on the substrate 2. Herein, the terms "optical signal", "laser", "light", plurals thereof and like terms may be used interchangeably.

The 1SOSU may receive at one or more optical inputs I1-I4 of the OSU1 and the OSU2 the modulated optical signals output on one or more of the optical outputs T1-T4 of the modulators M1-M4. Each of OSU1 and OSU2 may route and/or combine (in a manner discussed in greater detail hereinafter) the modulated optical signals output on one or more of the optical outputs T1-T2 and T3-T4 of the modulators M1-M4 and may output the routed and/or combined modulated optical signal on one or more of the optical outputs P1-P4 of OSU1 and OSU2.

As discussed above, the one or more modulated optical signals output on optical outputs P1 and P4 of OSU1 and OSU2 may be output directly on respective optical outputs O1 and O4 of the PIC chip shown in FIG. 1. One or more modulated optical signals output on optical outputs P2 and P3 of OSU1 and OSU2 may be received at optical inputs I5 and I6 of OSU3 which may route and/or combine the one or more modulated optical signals received at the optical inputs I5 and I6, and which may output the routed and/or combined one or more modulated optical signals received at the optical inputs I5 and I6 to outputs O2 and O3 of the PIC chip.

In one non-limiting embodiment or example in accordance with the principles of this disclosure, the PIC chip may also comprise a phase shifting unit 8 formed on the substrate including a first phase shifter (PS1) optically coupled between one of the optical inputs I1 or I2 of OSU and a corresponding optical output T1 or T2 of the modulator M1 or M2. The phase shifting unit 8 may also include a second phase shifter (PS2) optically coupled between one of the optical inputs I3 or I4 of OSU2 and a corresponding optical output T3 or T4 of the modulator M3 or M4. The phase shifter operation of each of PS1 and PS2 may individually controllable under the control of the controller 6.

In an example, the first phase shifter (PS1) may be formed on the substrate and be optically coupled between the optical output T2 of modulator M2 and the optical input I2 of OSU1 and the second phase shifter (PS2) may be formed on the substrate and optically coupled between the optical output T4 of modulator M4 and the optical input I4 of OSU2. However, this is not to be construed in a limiting sense since it is envisioned that PS1 may be optically coupled between the optical output T1 of modulator M and the optical input I1 of OSU1 and/or PS2 may be optically coupled between the optical output T3 of modulator M3 and the optical input I3 of OSU2.

In one non-limiting embodiment or example in accordance with the principles of this disclosure, the PIC chip may also comprise a single polarization rotator (PR) optically coupled between one of the optical outputs P2 or P3 of OSU1 or OSU2 and one of the optical inputs I5 or I6 of OSU3. In FIG. 1, the PR is shown (in solid lines) coupled between optical output P3 of OSU2 and optical input I6 of OSU3. However, this is not to be construed in a limiting sense since it is envisioned that the PR may instead be coupled (as shown in phantom lines) between optical output P2 of OSU1 and optical input I5 of OSU3.

In operation, each phase shifter PS1 and PS2 is operative, under the control of the controller 6, for shifting the phase of the optical signal passing therethrough. In operation, the PR is a passive device that rotates the polarization of an optical signal passing therethrough. The operation of each phase shifter PS and the polarization rotator PR is known in the art and will not be described further herein for the purpose of simplicity.

Figure 2A:
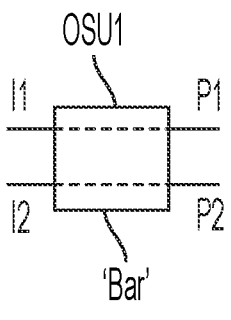
FIGS. 2A-2C are schematics of example single, isolated optical switch units of FIG. 1 in accordance with the principles of the present disclosure that may be used for each optical switch unit of the first and second stage optical switch units (1SOSU and 2SOSU) in FIG. 1, wherein the single optical switch unit may be set in a bar mode, a cross mode, and a coupler (or 3 db coupler) mode, respectively.
Figure 2B:
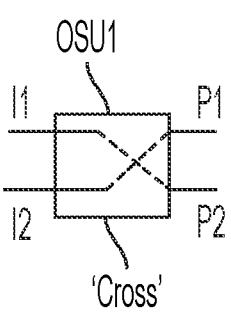
Figure 2C:
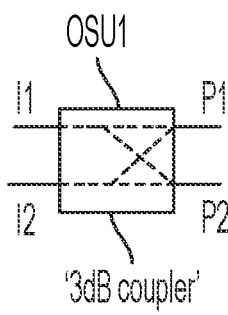

With reference to FIGS. 2A-2C and with continuing reference to FIG. 1, in some non-limiting embodiments or examples, each of OSU1, OSU2, and OSU3 may be configurable, in a manner known in the art, by controller 6 via the control inputs C1, C2, and C3 of OSU1, OSU2, and OSU3, in the following modes as shown, for example, by the isolated views of OSU1 in FIGS. 2A-2C:

1. a bar mode (FIG. 2A) wherein optical inputs I1 and I2 are optically coupled or routed to optical outputs P1 and P2, respectively;
2. a cross mode (FIG. 2B) wherein optical inputs I1 and I2 are optically coupled or routed to optical outputs P2 and P1, respectively; or
3. a coupler (or 3 dB coupler) mode (FIG. 2C) wherein optical signals input on optical inputs I1 and I2 are combined by OSU1 and said combined optical signals is output on both of optical outputs P1 and P2 of OSU1.

Similarly, as described in greater detail hereinafter in connection with FIG. 5, each of OSU4, OSU5 and OSU6 of input unit 4 may be configurable in the bar mode, the cross mode, and the coupler mode.

In the isolated views of OSU1 in FIGS. 2A-2C, the control input C1, shown in FIG. 1, is omitted for simplicity. However, it is to be understood that the control input C1 is present and utilized by controller 6 to control the mode or state of OSU1.

In an example, OSU1, OSU2, and OSU3 may be configurable, as a group, (under the control of the controller 6 via control inputs C1, C2, and C3 of OSU1, OSU2, and OSU3) in each of the following modes, one mode at a time:

1. the bar mode (FIG. 2A) wherein optical inputs I1, I2, I3, and I4 of OSU1 and OSU2 are optically coupled to optical outputs P1/O1, P2, P3, and P4/O4 of OSU1 and OSU2, and optical inputs I5 and I6 of OSU3 are optically coupled to optical outputs O2 and O3 of OSU3;

2. the cross mode (FIG. 2B) wherein optical inputs I1, I2, I3, and I4 of OSU1 and OSU2 are optically coupled to optical outputs P2, P1/O1, P4/O4, and P3 of OSU1 and OSU2, and optical inputs I5 and I6 of OSU3 are optically coupled to optical outputs O3 and O2 of OSU3; and
3. the coupler mode (FIG. 2C) including: optical input I1 of OSU1 optically coupled to optical outputs P1/O1 and P2, optical input I2 of OSU1 optically coupled to optical outputs P1/O1 and P2, optical input I3 of OSU2 optically coupled to optical outputs P3 and P4/O4, optical input I4 of OSU2 optically coupled to optical outputs P3 and P4/O4, optical input I5 of OSU3 optically coupled to optical outputs O2 and O3, and optical input I6 of OSU3 optically coupled to optical outputs O2 and O3, wherein, light input into each optical input is split between the corresponding optical outputs.

Figure 3:
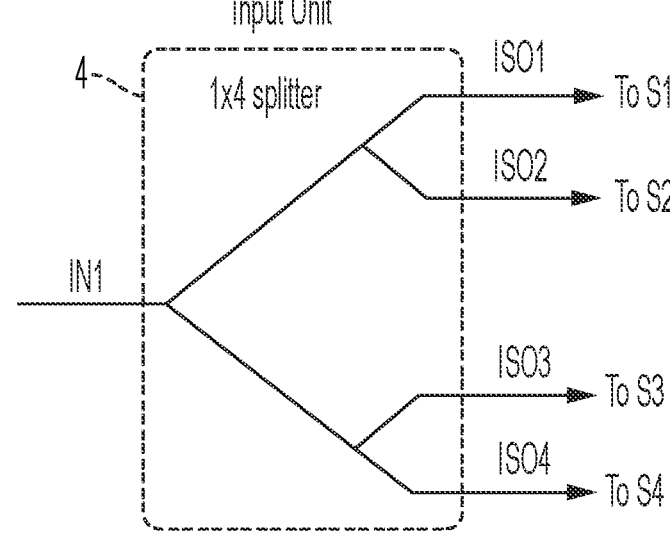
FIG. 3 is a schematic of 1×4 splitter in accordance with the principles of the present disclosure that may be used as the input unit of the PIC chip shown in FIG. 1.
Figure 4:
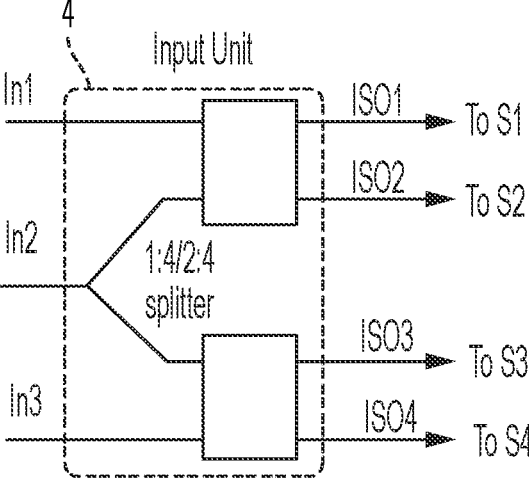
FIG. 4 is a schematic of 1:4/2:4 splitter in accordance with the principles of the present disclosure that may be used as the input unit of the PIC chip shown in FIG. 1, wherein the 1:4/2:4 splitter may be formed by one 1×2 splitter cascaded by two 2:2 splitters.
Figure 5:
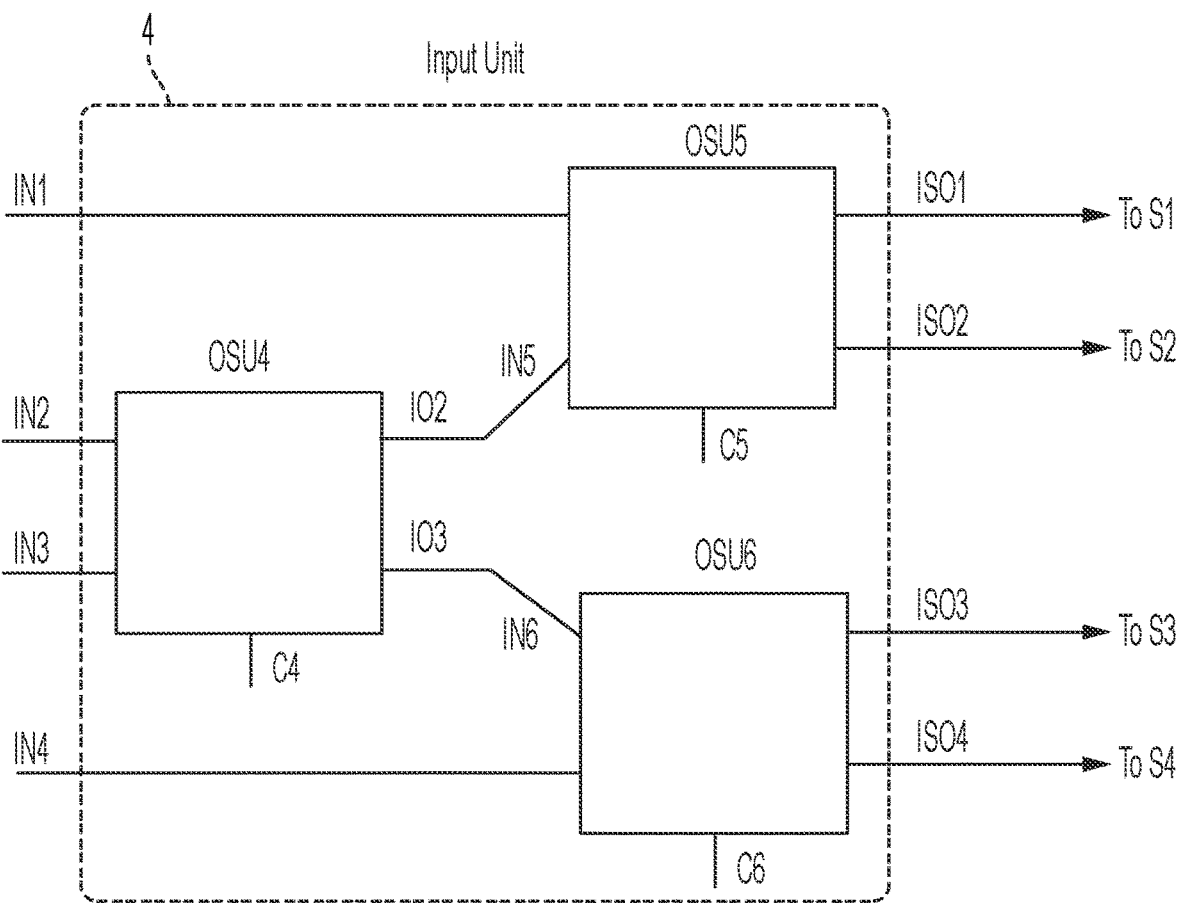
FIG. 5 is a schematic of a number of optical switch units that are optically coupled together in accordance with the principles of the present disclosure that may be used as the input unit of the PIC chip shown in FIG. 1.

With reference to FIGS. 3-5 and with continuing reference to all previous figures, in some non-limiting embodiments or examples in accordance with the principles of this disclosure, the input unit may comprise one of the following:

1. a 1:4 splitter (FIG. 3) including the at least one optical input IN1 optically coupled to the optical outputs ISO1-ISO4; or
2. a 1:4/2:4 splitter, formed, in an example, by one 1:2 splitter cascaded by two 2:2 splitters, (FIG. 4) including: (a) an optical input IN2 optically coupled to the optical outputs ISO1-ISO4, or (b) the optical input IN1 optically coupled to the optical outputs ISO1 and ISO2 and (c) an optical input IN4 optically coupled to the optical outputs ISO3 and ISO4; or
3. a combination (FIG. 5) including: a fourth optical switch unit (OSU4) including optical inputs IN2 and IN3 and optical outputs IO2 and IO3, a fifth optical switch unit (OSU5) including the optical input IN1 and an optical input IN5 coupled to the optical output IO2 of OSU4 and the optical outputs ISO1 and ISO2, and a sixth optical switch unit (OSU6) including an optical input IN4, an optical input IN6 coupled to the optical output IO3 of OSU4, and the optical outputs ISO3 and ISO4.

With continuing reference to FIG. 5 and reference back to FIGS. 2A-2C, in some non-limiting embodiments or examples, each of OSU4, OSU5, and OSU6 (like OSU1, OSU2, and OSU3 described above) may be configurable, by controller 6 via the control inputs C4, C5, and C6 of OSU4, OSU5, and OSU6, in the bar mode, the cross mode, or the coupler (or 3 dB coupler) mode as shown, for example, by the isolated view of OSU1 in FIGS. 2A-2C.

With continuing reference to FIG. 5, the OSU4, OSU5, and OSU6 of the input unit may be configurable, as a group, (under the control of the controller 6 via control inputs C4, C5, and C6 of OSU4, OSU5, and OSU6) in the following modes, one-mode at a time:

1. the bar mode including the optical inputs IN1-IN4 optically coupled to the optical outputs ISO1-ISO4; or
2. the cross mode including the optical inputs IN1, IN2, IN3, and IN4 optically coupled to the optical outputs ISO2, ISO4, ISO1, and ISO3; or
3. the coupler mode including: the optical input IN1 optically coupled to the optical outputs ISO1 and ISO2, the optical input IN2 optically coupled to the optical outputs ISO1-ISO4, the optical input IN3 optically coupled to the optical outputs ISO1-ISO4, the optical input IN4 optically coupled to the optical outputs ISO3 and ISO4, the optical input IN5 optically coupled to the optical outputs ISO1 and ISO2, and the optical input IN6 optically coupled to the optical outputs ISO3 and ISO4, wherein, light input into each optical input is split between the corresponding optical outputs.

In some non-limiting embodiments or examples, when OSU4-OSU6 of the input unit 4 are in the coupler mode, light input into the optical inputs IN1-IN4 is split evenly between the optical outputs ISO1-ISO4.

Various configurations of OSU4, OSU5, and/or OSU6 of the input unit 4 will now be described with reference to FIGS. 2A-2C and 5.

OSU4 in Bar Mode and OSU5 in Coupler Mode

In one non-limiting embodiment or example, when OSU4 is configured in a bar mode, wherein optical inputs IN2 and IN3 are optically coupled to the optical outputs IO2 and IO3, and OSU5 is configured in a coupler mode, wherein the optical input IN1 is optically coupled to the optical outputs ISO1 and ISO2 and the optical input IN5, which is optically coupled to the optical output IO2 of OSU4, is optically coupled to the optical outputs ISO1 and ISO2, the optical signal output on each of the optical inputs ISO1 and ISO2 may be the combination of the optical signals input into the optical inputs IN1 and IN2.

OSU4 in Bar Mode and OSU6 in Coupler Mode

In another non-limiting embodiment or example, when OSU4 is configured in a bar mode, wherein optical inputs IN2 and IN3 are optically coupled to the optical outputs IO2 and IO3, and OSU6 is configured in a coupler mode, wherein the optical input IN4 is optically coupled to the optical outputs ISO3 and ISO4 and the optical input IN5, which is optically coupled to the optical output IO3 of OSU4, is optically coupled to the optical outputs ISO3 and ISO4, the optical signal output on each of the optical inputs ISO3 and ISO4 may be the combination of optical signals input into the optical inputs IN3 and IN4.

OSU4 in Cross Mode and OSU5 in Coupler Mode

In another non-limiting embodiment or example, when OSU4 is configured in a cross mode, wherein the optical inputs IN2 and IN3 are optically coupled to the optical outputs IO3 and IO2, and OSU5 is configured in a coupler mode, wherein the optical input IN1 is optically coupled to the optical outputs ISO1 and ISO2, and the optical input IN5, which is optically coupled to the optical output IO2 of OSU4, is optically coupled to the optical outputs ISO1 and ISO2, the optical signal output on each of the optical outputs ISO1 and ISO2 is a combination of optical signals input into the optical inputs IN1 and IN3.

OSU4 in Cross Mode and OSU6 in Coupler Mode

In another non-limiting embodiment or example, when OSU4 is configured in a cross mode, wherein the optical inputs IN2 and IN3 are optically coupled to the optical outputs IO3 and IO2, and OSU6 is configured in a coupler mode, wherein the optical input IN4 is optically coupled to the optical outputs ISO3 and ISO4, and the optical input IN5, which is optically coupled to the optical output IO3 of OSU4, is optically coupled to the optical outputs ISO3 and ISO4, the optical signal output on each of the optical outputs ISO3 and ISO4 is a combination of optical signals input into the optical inputs IN2 and IN4.

OSU4 in Bar Mode and OSU5 in Bar Mode

In another non-limiting embodiment or example, when OSU4 is configured in a bar mode, wherein the optical inputs IN2 and IN3 are optically coupled to the optical outputs IO2 and IO3, and OSU5 is configured in a bar mode wherein the optical input IN1 is optically coupled to the optical output ISO1 and the optical input IN5, which is optically coupled to the optical output IO2 of OSU4, is optically coupled to the optical output ISO2, the optical signals output on the optical outputs ISO1 and ISO2 are the optical signals input into the optical inputs IN1 and IN2.

OSU4 in Bar Mode and OSU6 in Bar Mode

In another non-limiting embodiment or example, when OSU4 is configured in a bar mode, wherein the optical inputs IN2 and IN3 are optically coupled to the optical outputs IO2 and IO3, and OSU6 is configured in a bar mode wherein the optical input IN4 is optically coupled to the optical output ISO4 and the optical input IN3, which is optically coupled to the optical output IO3 of OSU4, is optically coupled to the optical output ISO3, whereupon the optical signals output on the optical outputs ISO3 and ISO4 are the optical signals input into the optical inputs IN3 and IN4.

OSU4 in Bar Mode and OSU5 in Cross Mode

In another non-limiting embodiment or example, when OSU4 is configured in a bar mode, wherein the optical inputs IN2 and IN3 are optically coupled to the optical outputs IO2 and IO3, and OSU5 is configured in a cross mode, wherein the optical input IN1 is optically coupled to the optical output ISO2 and the optical input IN5, which is optically coupled to the optical output IO2 of OSU4, is optically coupled to the optical output ISO1, the optical signals output on the optical outputs ISO1 and ISO2 are the optical signals input into the optical inputs IN2 and IN1.

OSU4 in Bar Mode and OSU6 in Cross Mode

In another non-limiting embodiment or example, when OSU4 is configured in a bar mode, wherein the optical inputs IN2 and IN3 are optically coupled to the optical outputs IO2 and IO3, and OSU6 is configured in a cross mode, wherein the optical input IN4 is optically coupled to the optical output ISO3 and the optical input IN6, which is optically coupled to the optical output IO3 of OSU4, is optically coupled to the optical output ISO4, the optical signals output on the optical outputs ISO3 and ISO4 are the optical signals input into the optical inputs IN4 and IN3.

OSU4 in Cross Mode and OSU5 in Bar Mode

In another non-limiting embodiment or example, when OSU4 is configured in a cross mode, wherein the optical inputs IN2 and IN3 are optically coupled to the optical outputs IO3 and IO2, and OSU5 is configured in a bar mode, wherein the optical input IN1 is optically coupled to the optical output ISO1 and the optical input IN5, which is optically coupled to the optical output IO2 of OSU4, is optically coupled to the optical output ISO2, the optical signals output on the optical outputs ISO1 and ISO2 are the optical signals input into the optical inputs IN1 and IN3.

OSU4 in Cross Mode and OSU6 in Bar Mode

In another non-limiting embodiment or example, when OSU4 is configured in a cross mode, wherein the optical inputs IN2 and IN3 are optically coupled to the optical outputs IO3 and IO2, and OSU6 is configured in a bar mode, wherein the optical input IN4 is optically coupled to the optical output ISO4 and the optical input IN6, which is optically coupled to the optical output IO3 of OSU4, is optically coupled to the optical output ISO3, the optical signals output on the optical outputs ISO3 and ISO4 are the optical signals input into the optical inputs IN2 and IN4.

OSU4 in Cross Mode and OSU5 in Cross Mode

In another non-limiting embodiment or example, when OSU4 is configured in a cross mode, wherein the optical inputs IN2 and IN3 are optically coupled to the optical outputs IO3 and IO2, and OSU5 is configured in a cross mode, wherein the optical input IN1 is optically coupled to the optical output ISO2 and the optical input IN5, which is optically coupled to the optical output IO2 of OSU4, is optically coupled to the optical output ISO1, the optical signals output on the optical outputs ISO1 and ISO2 are the optical signals input into the optical inputs IN3 and IN1.

OSU4 in Cross Mode and OSU6 in Cross Mode

In another non-limiting embodiment or example, when OSU4 is configured in a cross mode, wherein the optical inputs IN2 and IN3 are optically coupled to the optical outputs IO3 and IO2, and OSU6 is configured in a cross mode, wherein the optical input IN4 is optically coupled to the optical output ISO3 and the optical input IN6, which is optically coupled to the optical output IO3 of OSU4, is optically coupled to the optical output ISO4, the optical signals output on the optical outputs ISO3 and ISO4 are the optical signals input into the optical inputs IN4 and IN2.

With continuing reference to all of the figures, also disclosed herein, in one non-limiting embodiment or example in accordance with the principles of this disclosure, is a photonics integrated circuit (PIC) chip comprising a substrate 2 including a unit cell comprising an input unit 4 formed on the substrate and having at least one optical input (IN) and a plurality of optical outputs (ISO). A modulation unit (MU) of the a unit cell may also be formed on the substrate and include a plurality of modulators (M) having optical inputs(S) and optical outputs (T). The plurality of optical inputs S of the MU may be optically coupled to the plurality of optical outputs ISO of the input unit. Each modulator M may be operative for modulating light received at the optical input S of the modulator M and for outputting the modulated light on the optical output T of the modulator M.

A first stage optical switch unit (1SOSU) of the a unit cell may be formed on the substrate and may include a plurality of optical inputs (I) and first and second subsets of optical outputs (P). The plurality of optical inputs I of the 1SOSU may be optically coupled to the plurality of optical outputs T of the MU. The first subset of the optical outputs P (e.g., P1 and P4) of the 1SOSU may define a first subset of optical outputs O (e.g., O1 and O4) of the PIC chip.

A second stage optical switch unit (2SOSU) of the a unit cell may be formed on the substrate and may include a plurality of optical inputs I and a second subset of the optical outputs O (O2 and O3) of the PIC chip, wherein the plurality of optical inputs I (e.g., I5 and I6) of the 2SOSU may be optically coupled to the second subset of the optical outputs P (e.g., P2 and P3) of the 1SOSU.

The 1SOSU and the 2SOSU may be configured by the controller 6 in the following modes:

1. a coupler mode, wherein at least portions of the optical outputs T of the plurality of modulators M may be combined at each optical output O (e.g., O1-O4) of the 1SOSU and the 2SOSU;

2. a bar mode, wherein a first subset of the optical outputs T (e.g., T1 and T4) of the plurality of modulators M may be output directly on the first subset of the optical outputs O (e.g., O1 and O4) of the PIC chip and a second subset of the optical outputs T (e.g., T2 and T3) of the plurality of modulators M may be output on the second subset of the optical outputs O (e.g., O2 and O3) of the PIC chip via the 2SOSU; and 3. a cross mode, wherein a first subset of the optical outputs T (e.g., T2 and T3) of the plurality of modulators M may be crossed by the 1SOSU and output on the first subset of the optical outputs O (e.g., O1 and O4) of the PIC chip and a second subset of the optical outputs T (T1 and T4) of the plurality of modulators M may be crossed by the 2SOSU and is output on the second subset of the optical outputs O (e.g., O2 and O3) of the PIC chip.

Hereinafter, the variable "x" may be any whole number. Accordingly, the indication herein of any specific value of "x" for the purpose of example is not to be construed in a limiting sense.

In an example in accordance with the principles of this disclosure, the 1SOSU may include optical inputs I1-Ix (e.g., I1-I4) and may include optical outputs P1-Px (e.g., P1-P4) which define at least some optical outputs O1-Ox (e.g., O1 and O4) of the PIC chip.

In an example in accordance with the principles of this disclosure, the 2SOSU may include optical inputs I1'-Ix' (e.g., I5 and I6) and may include optical outputs O1'-Ox' (e.g., O2 and O3) of the PIC chip.

In an example in accordance with the principles of this disclosure, when the 1SOSU is in the bar mode, the optical inputs I1-Ix (e.g., I1-I4) of the 1SOSU may be coupled to the respective optical outputs P1-Px (e.g., P1-P4) of the 1SOSU.

In an example in accordance with the principles of this disclosure, when the 2SOSU is in the bar mode, the optical inputs I1'-Ix' (e.g., I5 and I6) of the 2SOSU may be coupled to the respective optical outputs O1'-Ox' (e.g., O2 and O3) of the PIC chip.

In an example in accordance with the principles of this disclosure, when the 1SOSU is in the coupler mode, at least portions of the optical inputs I1-Ix (e.g., I1-I2 and I3-I4) of the 1SOSU may be combined at each of the optical outputs P1-Px (e.g., P1-P2 and P3-P4) of the 1SOSU.

In an example in accordance with the principles of this disclosure, when the 2SOSU is in the coupler mode, at least portions of the optical inputs I1'-Ix' (e.g., I5-I6) of the 2SOSU may be combined at each of the optical outputs O1'-Ox' (e.g., O2-O3) of the PIC chip.

In an example in accordance with the principles of this disclosure, when the 1SOSU is in the cross mode, the optical inputs I1-Ix (e.g., I1-I2 and I3-I4) of the 1SOSU may be coupled to the respective optical outputs Px-P1 (e.g., P2-P1 and P4-P3) of the 1SOSU.

Finally, in an example in accordance with the principles of this disclosure, when the 2SOSU is in the cross mode, the optical inputs I1'-Ix' (e.g., I5-I6) of the 2SOSU may be coupled to the respective optical outputs Ox'-O1' (e.g., O3-O2) of the PIC chip.

In some non-limiting embodiments or examples in accordance with the principles of this disclosure, an optional phase shifting unit of the a unit cell may be formed on the substrate 2 between the MU and the 1SOSU. In an example, the phase shifting unit may include a first phase shifter (PS1) formed on the substrate and optically coupled between one of the optical inputs I1 or I2 of OSU1 and a corresponding optical output T1 or T2 of the modulator M1 or M2. The phase shifting unit may also include a second phase shifter (PS2) formed on the substrate and optically coupled between one of the optical inputs I3 or I4 of OSU2 and a corresponding optical output T3 or T4 of the modulator M3 or M4. In a specific example, the first phase shifter (PS1) may be optically coupled between the optical output T (e.g., T2) of a first of the plurality of modulators M (e.g., M2) and a first of the plurality of optical inputs I (e.g., I2) of the 1SOSU. The phase shifting unit may also include a second phase shifter (PS2) optically coupled between the optical output T (e.g., T4) of a second of the plurality of modulators M (e.g., M4) and a second of the plurality of optical inputs I (e.g., I4) of the 1SOSU. In some non-limiting embodiments or examples in accordance with the principles of this disclosure, an optional polarization rotator of the a unit cell may be formed on the substrate 2 between one of the optical outputs P (e.g., P2 or P3)) the 1SOSU and one of the optical inputs I' (e.g., I5 or I6) of the 2SOSU.

In an example in accordance with the principles of this disclosure, the input unit may comprise at least one of the following: a 1:4 splitter or a 2:4 splitter.

In an example in accordance with the principles of this disclosure, the input unit may comprise an input optical switch unit including a plurality of optical inputs (IN1-INx) (e.g., IN1-IN4) and the plurality of optical outputs (ISO1-ISOx) (e.g., ISO1-ISO4), wherein the input optical switch unit may be configurable by the controller 6 in the following modes:

1. a coupler mode, wherein at least portions of optical signals input into the plurality of optical inputs IN1-INx (e.g., IN1-IN4) of the input optical switch unit are combined at each optical output ISO1-ISOx (e.g., ISO1-ISO4) of the input optical switch unit;

2. a bar-bar mode, wherein optical signals input into the plurality of optical inputs IN1-INx (e.g., IN1-IN4) of the input optical switch unit are output directly to the respective optical outputs ISO1-ISOx (e.g., ISO1-ISO4) of the input optical switch unit;

3. a bar-coupler or cross-coupler mode, wherein a subset of at least portions of the optical signals input into the plurality of optical inputs IN1-INx (e.g., IN1-IN4) of the input optical switch unit are combined and output on a subset optical output ISO1-ISOx (e.g., ISO1-ISO4) of the input optical switch unit; and 4. bar-cross or a cross-cross mode, wherein a subset of the optical signals input into the plurality of optical inputs IN1-INx (e.g., IN1-IN4) of the input optical switch unit are crossed and output to optical outputs ISOx-ISO1 (e.g., ISO4-ISO1) of the input optical switch unit.

As can be understood from the foregoing, by selection of an appropriate one of the input units 4 shown in FIGS. 3-5 to use with the combination of the MU, the phase shifting unit 8, the 1SOSU, the PR, and the 2SOSU shown in FIG. 1, the PIC chip can be configured to support various datacenter IMDD and/or telecom coherent transmission applications.

Herein, the input unit 4 is illustrated and described as being formed on the same substrate 2 as the MU, the phase shifting unit 8, the 1SOSU, the PR, and the 2SOSU. However, this is not to be construed in a limiting sense since it is envisioned the input unit 4 may be formed on a separate substrate (not shown) and optically coupled, in a manner known in the art, to the substrate 2 that includes the MU, the phase shifting unit 8, the 1SOSU, the PR, and the 2SOSU—but excludes the input unit 4. In this way, the different input units 4 shown in FIGS. 3-5 can be selectively used with the substrate 2 that includes the MU, the phase shifting unit 8, the 1SOSU, the PR, and the 2SOSU (but excludes the input unit 4). Furthermore, each input unit 4 shown in FIGS. 3-5 can be manufactured as first photonics chip, as needed, separately from a second photonics chip that includes the substrate 2 including the MU, the phase shifting unit 8, the 1SOSU, the PR, and the 2SOSU (but excluding the input unit 4), whereupon the second photonics chip can be utilized, as needed, with a first photonics chip that includes appropriate circuitry, e.g., the 1×4 splitter (FIG. 3), or the 1:4/2:4 splitter (FIG. 4), or the OSU4-OSU6 (FIG. 5), deemed suitable and/or desirable for a particular application, e.g., datacenter IMDD and/or telecom coherent transmission.

Finally, the controller 6 may be formed on or off of the substrate 2 as may be deemed suitable and/or desirable for a particular application.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A photonics integrated circuit (PIC) chip comprising:
a substrate;
an input unit formed on the substrate and including at least one optical input IN1 and optical outputs ISO1-ISO4;
a modulation unit (MU) formed on the substrate, the MU including modulators M1-M4 having optical inputs S1-S4 and optical outputs T1-T4, wherein the optical inputs S1-S4 are optically coupled to optical outputs ISO1-ISO4 of the input unit, wherein each modulator is operative for modulating light received at the optical input of the modulator and for outputting the modulated light on the optical output of the modulator;
a first stage optical switch unit (1SOSU) formed on the substrate, the 1SOSU including:
a first optical switch unit (OSU1) including optical inputs I1 and I2 and optical outputs P1/O1 and P2, wherein the optical inputs I1 and I2 are optically coupled to the optical outputs T1 and T2 of the modulators M1 and M2, and
a second optical switch unit (OSU2) including optical inputs I3 and I4 and optical outputs P3 and P4/O4, wherein the optical inputs I3 and I4 are optically coupled to the optical outputs T3 and T4 of the modulators M3 and M4;
and
a second stage optical switch unit (2SOSU) formed on the substrate, the 2SOSU including a third optical switch unit (OSU3) including optical inputs I5 and I6 and optical outputs O2 and O3, wherein the optical inputs I5 and I6 are optically coupled to optical outputs P2 and P3 of OSU1 and OSU2,
wherein the input unit comprises a plurality of optical inputs (IN1-IN4) and the optical outputs (ISO1-ISO4), wherein the input unit is configurable by a controller in the following modes:
a coupler mode, wherein at least portions of optical inputs into the plurality of optical inputs IN1-IN4 of the input unit are combined at each optical output ISO1-ISO4 of the input unit;
a bar-bar mode, wherein optical inputs into the plurality of optical inputs IN1-IN4 of the input unit are output directly to the respective optical outputs ISO1-ISO4 of the input unit;
a bar-coupler or cross-coupler mode, wherein a subset of at least portions of the optical inputs into the plurality of optical inputs IN1-IN4 of the input unit are combined and output on a subset optical output ISO1-ISO4 of the input unit; and
bar-cross or a cross-cross mode, wherein a first subset of the optical inputs into the plurality of optical inputs IN1-IN4 of the input unit are crossed and output to optical outputs ISO4-ISO1 of the input unit.

2. The PIC chip of claim 1, further including:

a first phase shifter (PS1) formed on the substrate and optically coupled between one of the optical inputs I1 or I2 of OSU1 and a corresponding optical output T1 or T2 of the modulator M1 or M2;

a second phase shifter (PS2) formed on the substrate and optically coupled between one of the optical inputs I3 or I4 of OSU2 and a corresponding optical output T3 or T4 of the modulator M3 or M4;

a polarization rotator (PR) optically coupled between one of the optical outputs P2 or P3 of OSU1 or OSU2 and one of the optical inputs I5 or I6 of OSU3.

3. The PIC chip of claim 2, wherein:

the first phase shifter (PS1) is optically coupled between the optical output T2 of modulator M2 and the optical input I1 of OSU1;

the second phase shifter (PS2) is optically coupled between the optical output T4 of modulator M4 and the optical input I4 of OSU2; and the polarization rotator is optically coupled between the optical output P2 of OSU1 and the optical input I5 of OSU3 or between the optical output P3 of OSU2 and the optical input I6 of OSU3.

4. The PIC chip of claim 1, wherein the OSUs are configurable in the following modes:

a bar mode including optical inputs I1, I2, I3, and I4 of OSU1 and OSU2 optically coupled to optical outputs P1/O1, P2, P3, and P4/O4 of OSU1 and OSU2, and optical inputs I5 and I6 of OSU3 optically coupled to optical outputs O2 and O3 of OSU3; or a cross mode including optical inputs I1, I2, I3, and I4 of OSU1 and OSU2 optically coupled to optical outputs P2, P1/O1, P4/O4, and P3 of OSU1 and OSU2, and optical inputs I5 and I6 of OSU3 optically coupled to optical outputs O3 and O2 of OSU3; or a coupler mode including:

optical input I1 optically coupled to optical outputs P1/O1 and P2, optical input I2 optically coupled to optical outputs P1/O1 and P2, optical input I3 optically coupled to optical outputs P3 and P4/O4, optical input I4 optically coupled to optical outputs P3 and P4/O4, optical input I5 optically coupled to optical outputs O2 and O3, and optical input I6 optically coupled to optical outputs O2 and O3, wherein, light input into each optical input is split between the corresponding optical outputs.

5. The PIC chip of claim 4, wherein:

for a coherent application, all of the OSUs are set to the coupler mode; and for an Intensity-Modulated Direct Detection (IMDD) application, all of the OSUs are set to either the bar mode or the cross mode.

6. The PIC chip of claim 5, wherein in the coherent application, the optical output of the PIC chip is one of the optical outputs O2 or O3.

7. The PIC chip of claim 5, wherein in the IMDD application:

in a DR4 mode of operation, modulated light is output on all of the optical outputs O1-O4; and in a DR1 mode of operation, modulated light is output on any one of the optical outputs O1-O4.

8. A photonics integrated circuit (PIC) chip comprising:

a substrate;

an input unit formed on the substrate and including at least one optical input IN1 and optical outputs ISO1-ISO4;

a modulation unit (MU) formed on the substrate, the MU including modulators M1-M4 having optical inputs S1-S4 and optical outputs T1-T4, wherein the optical inputs S1-S4 are optically coupled to optical outputs ISO1-ISO4 of the input unit, wherein each modulator is operative for modulating light received at the optical input of the modulator and for outputting the modulated light on the optical output of the modulator;

a first stage optical switch unit (1SOSU) formed on the substrate, the 1SOSU including:

a first optical switch unit (OSU1) including optical inputs I1 and I2 and optical outputs P1/O1 and P2, wherein the optical inputs I1 and I2 are optically coupled to the optical outputs T1 and T2 of the modulators M1 and M2, and a second optical switch unit (OSU2) including optical inputs I3 and I4 and optical outputs P3 and P4/O4, wherein the optical inputs I3 and I4 are optically coupled to the optical outputs T3 and T4 of the modulators M3 and M4;

and a second stage optical switch unit (2SOSU) formed on the substrate, the 2SOSU including a third optical switch unit (OSU3) including optical inputs I5 and I6 and optical outputs O2 and O3, wherein the optical inputs I5 and I6 are optically coupled to optical outputs P2 and P3 of OSU1 and OSU2, wherein the input unit comprises:

a fourth optical switch unit (OSU4) including optical inputs IN2 and IN3 and optical outputs IO2 and IO3, a fifth optical switch unit (OSU5) including the optical input IN1, an optical input IN5 coupled to the optical output IO2 of OSU4, and the optical outputs ISO1 and ISO2, and a sixth optical switch unit (OSU6) including an optical input IN4, an optical input IN6 coupled to the optical output IO3 of OSU4, and the optical outputs ISO3 and ISO4.

9. The PIC chip of claim 8, wherein OSU4-OSU6 of the input unit are configurable in the following modes:

a bar mode including the optical inputs IN1-IN4 optically coupled to the optical outputs ISO1-ISO4; or a cross mode including the optical inputs IN1, IN2, IN3, and IN4 optically coupled to the optical outputs ISO2, ISO4, ISO1, and ISO3; or a coupler mode including:

the optical input IN1 optically coupled to the optical outputs ISO1 and ISO2, the optical input IN2 optically coupled to the optical outputs ISO1-ISO4, the optical input IN3 optically coupled to the optical outputs ISO1-ISO4, the optical input IN4 optically coupled to the optical outputs ISO3 and ISO4, the optical input IN5 optically coupled to the optical outputs ISO1 and ISO2, and the optical input IN6 optically coupled to the optical outputs ISO3 and ISO4, wherein, light input into each optical input is split between the corresponding optical outputs.

10. The PIC chip of claim 9, wherein, when OSU4-OSU6 of the input unit are in the coupler mode, light input into the optical inputs IN1-IN4 is split evenly between the optical outputs ISO1-ISO4.

11. The PIC chip of claim 8, wherein:

OSU4 is configured in a bar mode wherein the optical inputs IN2 and IN3 are optically coupled to the optical outputs IO2 and IO3; and at least one of the following:

OSU5 is configured in a coupler mode wherein the optical input IN1 is optically coupled to the optical outputs ISO1 and ISO2 and the optical input IN5, which is optically coupled to the optical output IO2 of OSU4, is optically coupled to the optical outputs ISO1 and ISO2, whereupon the optical signal output on each of the optical outputs ISO1 and ISO2 is a combination of the optical signals input into the optical inputs IN1 and IN2;

and

OSU6 is configured in a coupler mode wherein the optical input IN4 is optically coupled to the optical outputs ISO3 and ISO4 and the optical input IN5, which is optically coupled to the optical output IO3 of OSU4, is optically coupled to the optical outputs ISO3 and ISO4, whereupon the optical signal output on each of the optical outputs ISO3 and ISO4 is a combination of optical signals input into the optical inputs IN3 and IN4.

12. The PIC chip of claim 8, wherein:

OSU4 is configured in a cross mode wherein the optical inputs IN2 and IN3 are optically coupled to the optical outputs IO3 and IO2; and at least one of the following:

OSU5 is configured in a coupler mode wherein the optical input IN1 is optically coupled to the optical outputs ISO1 and ISO2 and the optical input IN5, which is optically coupled to the optical output IO2 of OSU4, is optically coupled to the optical outputs ISO1 and ISO2, whereupon the optical signal output on each of the optical outputs ISO1 and ISO2 is a combination of optical signals input into the optical inputs IN1 and IN3;

and

OSU6 is configured in a coupler mode wherein the optical input IN4 is optically coupled to the optical outputs ISO3 and ISO4 and the optical input IN5, which is optically coupled to the optical output IO3 of OSU4, is optically coupled to the optical outputs ISO3 and ISO4, whereupon the optical signal output on each of the optical outputs ISO3 and ISO4 is a combination of optical signals input into the optical inputs IN2 and IN4.

13. The PIC chip of claim 8, wherein:

OSU4 is configured in a bar mode wherein the optical inputs IN2 and IN3 are optically coupled to the optical outputs IO2 and IO3; and at least one of the following:

OSU5 is configured in a bar mode wherein the optical input IN1 is optically coupled to the optical output ISO1 and the optical input IN5, which is optically coupled to the optical output IO2 of OSU4, is optically coupled to the optical output ISO2, whereupon the optical signals output on the optical outputs ISO1 and ISO2 are the optical signals input into the optical inputs IN1 and IN2;

and

OSU6 is configured in a bar mode wherein the optical input IN4 is optically coupled to the optical output ISO4 and the optical input IN3, which is optically coupled to the optical output IO3 of OSU4, is optically coupled to the optical output ISO3, whereupon the optical signals output on the optical outputs ISO3 and ISO4 are the optical signals input into the optical inputs IN3 and IN4.

14. The PIC chip of claim 8, wherein:

OSU4 is configured in a bar mode wherein the optical inputs IN2 and IN3 are optically coupled to the optical outputs IO2 and IO3; and at least one of the following:

OSU5 is configured in a cross mode wherein the optical input IN1 is optically coupled to the optical output ISO2 and the optical input IN5, which is optically coupled to the optical output IO2 of OSU4, is optically coupled to the optical output ISO1, whereupon the optical signals output on the optical outputs ISO1 and ISO2 are the optical signals input into the optical inputs IN2 and IN1;

and

OSU6 is configured in a cross mode wherein the optical input IN4 is optically coupled to the optical output ISO3 and the optical input IN6, which is optically coupled to the optical output IO3 of OSU4, is optically coupled to the optical output ISO4, whereupon the optical signals output on the optical outputs ISO3 and ISO4 are the optical signals input into the optical inputs IN4 and IN3.

15. The PIC chip of claim 8, wherein:

OSU4 is configured in a cross mode wherein the optical inputs IN2 and IN3 are optically coupled to the optical outputs IO3 and IO2; and at least one of the following:

OSU5 is configured in a bar mode wherein the optical input IN1 is optically coupled to the optical output ISO1 and the optical input IN5, which is optically coupled to the optical output IO2 of OSU4, is optically coupled to the optical output ISO2, whereupon the optical signals output on the optical outputs ISO1 and ISO2 are the optical signals input into the optical inputs IN1 and IN3;

and

OSU6 is configured in a bar mode wherein the optical input IN4 is optically coupled to the optical output ISO4 and the optical input IN6, which is optically coupled to the optical output IO3 of OSU4, is optically coupled to the optical output ISO3, whereupon the optical signals output on the optical outputs ISO3 and ISO4 are the optical signals input into the optical inputs IN2 and IN4.

16. The PIC chip of claim 8, wherein:

OSU4 is configured in a cross mode wherein the optical inputs IN2 and IN3 are optically coupled to the optical outputs IO3 and IO2; and at least one of the following:

OSU5 is configured in a cross mode wherein the optical input IN1 is optically coupled to the optical output ISO2 and the optical input IN5, which is optically coupled to the optical output IO2 of OSU4, is optically coupled to the optical output ISO1, whereupon the optical signals output on the optical outputs ISO1 and ISO2 are the optical signals input into the optical inputs IN3 and IN1;

and

OSU6 is configured in a cross mode wherein the optical input IN4 is optically coupled to the optical output ISO3 and the optical input IN6, which is optically coupled to the optical output IO3 of OSU4, is optically coupled to the optical output ISO4, whereupon the optical signals output on the optical outputs ISO3 and ISO4 are the optical signals input into the optical inputs IN4 and IN2.

17. A photonics integrated circuit (PIC) chip comprising:

a substrate;

an input unit formed on the substrate and including at least one optical input (IN) and a plurality of optical outputs (ISO);

a modulation unit (MU) formed on the substrate, the MU including a plurality of modulators (M) having optical inputs(S) and optical outputs (T), wherein the plurality of optical inputs S of the MU are optically coupled to the plurality of optical outputs ISO of the input unit, wherein each modulator M is operative for modulating light received at the optical input S of the modulator M and for outputting the modulated light on the optical output T of the modulator M;

a first stage optical switch unit (1SOSU) formed on the substrate and including a plurality of optical inputs (I) and first and second subsets of optical outputs, wherein:

the plurality of optical inputs I of the 1SOSU are optically coupled to the plurality of optical outputs T of the MU, and the first subset of the optical outputs of the 1SOSU define a first subset of optical outputs of the PIC chip;

and a second stage optical switch unit (2SOSU) formed on the substrate and including a plurality of optical inputs I and a second subset of the optical outputs of the PIC chip, wherein the plurality of optical inputs I of the 2SOSU are optically coupled to the second subset of the optical outputs of the 1SOSU;

wherein the 1SOSU and the 2SOSU are each configurable by a controller in the following modes:

a coupler mode, wherein at least portions of the optical outputs T of the plurality of modulators M are combined at each optical output of the 1SOSU and the 2SOSU;

a bar mode, wherein a first subset of the optical outputs T of the plurality of modulators M is output directly on the first subset of the optical outputs of the PIC chip and a second subset of the optical outputs T of the plurality of modulators M is output on the second subset of the optical outputs of the PIC chip via the 2SOSU; and a cross mode, wherein a first subset of the optical outputs T of the plurality of modulators M is crossed by the 1SOSU and output on the first subset of the optical outputs of the PIC chip and a second subset of the optical outputs T of the plurality of modulators M is crossed by the 2SOSU and is output on the second subset of the optical outputs of the PIC chip, wherein the input unit comprises a plurality of optical inputs (IN1-INx) and the plurality of optical outputs (ISO1-ISOx), wherein the input unit is configurable by a controller in the following modes:

a coupler mode, wherein at least portions of optical inputs into the plurality of optical inputs IN1-INx of the input unit are combined at each optical output ISO1-ISOx of the input unit;

a bar-bar mode, wherein optical inputs into the plurality of optical inputs IN1-INx of the input unit are output directly to the respective optical outputs ISO1-ISOx of the input unit;

a bar-coupler or cross-coupler mode, wherein a subset of at least portions of the optical inputs into the plurality of optical inputs IN1-INx of the input unit are combined and output on a subset optical output ISO1-ISOx of the input unit; and bar-cross or a cross-cross mode, wherein a first subset of the optical inputs into the plurality of optical inputs IN1-INx of the input unit are crossed and output to optical outputs ISOx-ISO1 of the input unit.

18. The PIC chip of claim 17, wherein:

the 1SOSU includes optical inputs I1-Ix and optical outputs P1-Px, wherein at least part of the optical outputs P1-Px define optical outputs O1-Ox of the PIC chip; and the 2SOSU includes optical inputs I1'-Ix' and optical outputs O1'-Ox' of the PIC chip;

when the 1SOSU is in the bar mode, the optical inputs I1-Ix of the 1SOSU are coupled to the respective optical outputs P1-Px of the 1SOSU;

when the 2SOSU is in the bar mode, the optical inputs I1'-Ix' of the 2SOSU are coupled to the respective optical outputs O1'-Ox' of the PIC chip;

when the 1SOSU is in the coupler mode, at least portions of the optical inputs I1-Ix of the 1SOSU are combined at each of the optical outputs P1-Px of the 1SOSU;

when the 2SOSU is in the coupler mode, at least portions of the optical inputs I1'-Ix' of the 2SOSU are combined at each of the optical outputs O1'-Ox' of the PIC chip;

when the 1SOSU is in the cross mode, the optical inputs I1-Ix of the 1SOSU are coupled to the respective optical outputs Px-P1 of the 1SOSU; and when the 2SOSU is in the cross mode, the optical inputs I1'-Ix' of the 2SOSU are coupled to the respective optical outputs Ox'-O1' of the PIC chip.

19. The PIC chip of claim 17, further including a phase shifting unit formed on the substrate between the MU and the 1SOSU, the phase shifting unit including:

a first phase shifter optically coupled between the optical output T of a first of the plurality of modulators M and a first of the plurality of optical inputs I of the 1SOSU; and a second phase shifter optically coupled between the optical output T of a second of the plurality of modulators M and a second of the plurality of optical inputs I of the 1SOSU.

20. The PIC chip of claim 17, further including polarization rotator formed on the substrate between one of the optical outputs P the 1SOSU and one of the optical inputs I' of the 2SOSU.

21. The PIC chip of claim 17, wherein the input unit comprises at least one of the following:

a 1:4 splitter; and a 2:4 splitter.

* * * * *